(12) United States Patent
Chang et al.

(10) Patent No.: US 11,656,392 B2
(45) Date of Patent: May 23, 2023

(54) OPTICAL ELEMENT AND WAFER LEVEL OPTICAL MODULE

(71) Applicant: HIMAX TECHNOLOGIES LIMITED, Tainan (TW)

(72) Inventors: Chih-Sheng Chang, Tainan (TW); Meng-Ko Tsai, Tainan (TW); Teng Te Huang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 357 days.

(21) Appl. No.: 16/990,989

(22) Filed: Aug. 11, 2020

(65) Prior Publication Data

US 2022/0050235 A1 Feb. 17, 2022

(51) Int. Cl.
*G02B 5/20* (2006.01)
*B29D 11/00* (2006.01)

(52) U.S. Cl.
CPC .......... *G02B 5/20* (2013.01); *B29D 11/00634* (2013.01)

(58) Field of Classification Search
CPC ...... G02B 5/20; G02B 5/201; G02B 19/0028; B29D 11/00634; B29D 11/00307; H01S 5/005; H01S 5/423; H01S 5/06; H01L 27/153; H01L 33/58; H01L 2933/0058
USPC .......................................................... 359/359
See application file for complete search history.

(56) References Cited

U.S. PATENT DOCUMENTS

| 9,482,796 B2* | 11/2016 | Arbabi | G02B 5/1842 |
| 2012/0182714 A1* | 7/2012 | Kwon | H05B 33/14 |
| | | | 427/157 |
| 2014/0098433 A1* | 4/2014 | Hsiao | G02B 13/0085 |
| | | | 29/407.04 |
| 2015/0204511 A1* | 7/2015 | Rudmann | G01J 3/1804 |
| | | | 362/346 |
| 2019/0243155 A1* | 8/2019 | You | G02B 27/4272 |

FOREIGN PATENT DOCUMENTS

| CN | 109686763 | 4/2019 |
| CN | 110275381 | 9/2019 |
| CN | 110737102 | 1/2020 |
| TW | I699512 | 7/2020 |

OTHER PUBLICATIONS

"Office Action of Taiwan Counterpart Application", dated Feb. 10, 2022, p. 1-p. 6.

* cited by examiner

*Primary Examiner* — Jade R Chwasz

(74) *Attorney, Agent, or Firm* — JCIPRNET

(57) ABSTRACT

An optical element including a substrate, a first optical film and a second optical film. The first optical film and the second optical film are disposed on at least one side of the substrate and are both formed on the substrate. The first optical film has a first surface facing away from the substrate and a plurality of first optical microstructures disposed on the first surface. The second optical film has a second surface facing away from the substrate and a plurality of second optical microstructures disposed on the second surface. The orthogonal projection of the first optical microstructures on the substrate does not overlap the orthogonal projection of the second optical microstructures on the substrate. A wafer level optical module adopting the optical element is also provided.

16 Claims, 7 Drawing Sheets

OPTICAL ELEMENT AND WAFER LEVEL OPTICAL MODULE

BACKGROUND

Technical Field

The invention relates to optical element and optical module, and in particular, to an optical element and a wafer level optical module.

Description of Related Art

In recent years, along with a trend of module miniaturization and low price of electronic products, a wafer level module (WLM) technique draws attention. The WLM technique is mainly to use a wafer level fabrication technique to miniaturize a volume of the electronic product and decrease the cost thereof. For example, when the aforementioned technique is applied to fabricate wafer level optical (WLO) lens modules, the WLO lens modules may have smaller volume compares with that of a conventional lens module, so that the WLO lens modules can be applied to camera modules of, for example, mobile phones.

However, along with increasing demand on optical functionality of the electronic product, the number of optical components (for example, dot projector, flood illuminator and proximity sensor) adopted in the WLO module inevitably increases, so that the miniaturization of the WLO module becomes more difficult due to the increasing structural complexity.

SUMMARY

The disclosure provides an optical element with multi-function.

The disclosure provides a wafer level optical module with high integration and better functionality.

The optical element of the disclosure includes: a substrate, a first optical film and a second optical film. The first optical film and the second optical film are disposed on at least one side of the substrate and are both formed on the substrate. The first optical film has a first surface facing away from the substrate and a plurality of first optical microstructures disposed on the first surface. The second optical film has a second surface facing away from the substrate and a plurality of second optical microstructures disposed on the second surface. The orthogonal projection of the first optical microstructures on the substrate does not overlap the orthogonal projection of the second optical microstructures on the substrate.

In an embodiment of the disclosure, the substrate of the optical element has a first side and a second side opposite to each other. The first optical film and the second optical film are respectively disposed on the first side and the second side of the substrate.

In an embodiment of the disclosure, the optical element further comprises a buffer layer. The buffer layer is disposed between the substrate and the second optical film.

In an embodiment of the disclosure, according to the optical element, the orthogonal projection of the buffer layer on the substrate does not overlap the orthogonal projection of the first optical microstructures.

In an embodiment of the disclosure, the optical element further comprises an index matching layer. The buffer layer is disposed between the substrate and the first optical film.

In an embodiment of the disclosure, according to the optical element, the orthogonal projection of the index matching layer on the substrate does not overlap the orthogonal projection of the second optical microstructures on the substrate.

In an embodiment of the disclosure, according to the optical element, the orthogonal projection of the first optical film on the substrate does not overlap the orthogonal projection of the second optical film.

In an embodiment of the disclosure, the first optical film and the second optical film of the optical element are located on the same side of the substrate, the first optical film is positioned between the substrate and the second optical film, the first optical microstructures are a plurality of protruding structures, and the second optical microstructures are a plurality of concave structures.

In an embodiment of the disclosure, the optical element further comprises an index matching layer. The index matching layer is disposed between the substrate and the first optical film.

In an embodiment of the disclosure, the optical element further comprises a buffer layer. The buffer layer is disposed between the substrate and the second optical film.

The wafer level optical module of the disclosure includes: an optical element and a light emitter. The optical element comprises: a substrate, a first optical film and a second optical film. The first optical film and the second optical film are disposed on at least one side of the substrate and are both formed on the substrate. The first optical film has a first surface facing away from the substrate and a plurality of first optical microstructures disposed on the first surface. The second optical film has a second surface facing away from the substrate and a plurality of second optical microstructures disposed on the second surface. The orthogonal projection of the first optical microstructures on the substrate does not overlap the orthogonal projection of the second optical microstructures on the substrate. The light emitter has at least two light emitting devices. The optical element is arranged on an optical path of the light emitter. One of the at least two light emitting devices overlaps the first optical microstructures, and another one of the at least two light emitting devices overlaps the second optical microstructures.

In an embodiment of the disclosure, according to the wafer level optical module, the at least two light emitting devices are a vertical cavity surface emitting laser array.

In an embodiment of the disclosure, the wafer level optical module further comprises a controlling circuit board. The controlling circuit board is electrically coupled to the at least two light emitting devices. The at least two light emitting devices are independently controllable by the controlling circuit board.

In an embodiment of the disclosure, according to the wafer level optical module, the substrate has a first side and a second side opposite to each other. The first optical film and the second optical film are respectively disposed on the first side and the second side of the substrate.

In an embodiment of the disclosure, according to the wafer level optical module, the orthogonal projection of the first optical film on the substrate does not overlap the orthogonal projection of the second optical film on the substrate.

In an embodiment of the disclosure, the wafer level optical module further comprises an index matching layer and a buffer layer. The index matching layer is disposed between the substrate and the first optical film. The buffer layer is disposed between the substrate and the second optical film.

In an embodiment of the disclosure, according to the wafer level optical module, the orthogonal projection of the buffer layer on the substrate does not overlap the orthogonal projection of the first optical microstructures on the substrate.

In an embodiment of the disclosure, according to the wafer level optical module, the orthogonal projection of the index matching layer on the substrate does not overlap the orthogonal projection of the second optical microstructures on the substrate.

In an embodiment of the disclosure, according to the wafer level optical module, the first optical film and the second optical film are located on the same side of the substrate. The first optical film is positioned between the substrate and the second optical film. The first optical microstructures are a plurality of protruding structures. The second optical microstructures are a plurality of concave structures.

In an embodiment of the disclosure, the wafer level optical module further comprises an index matching layer and a buffer layer. The index matching layer is disposed between the substrate and the first optical film. The buffer layer is disposed between the first optical film and the second optical film.

Based on the above, in the optical element and the wafer level optical module according to an embodiment of the disclosure, two optical films are disposed on at least one side of the substrate and are both formed on the substrate so that the whole thickness of the optical element can be effectively reduced. Further, each of the optical films has a plurality of optical microstructures. The optical microstructures of one of the optical films does not overlap the optical microstructures of the other of the optical films so that the optical element can be provided with more optical functionality. Accordingly, the integration degree of the wafer level optical module can be improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
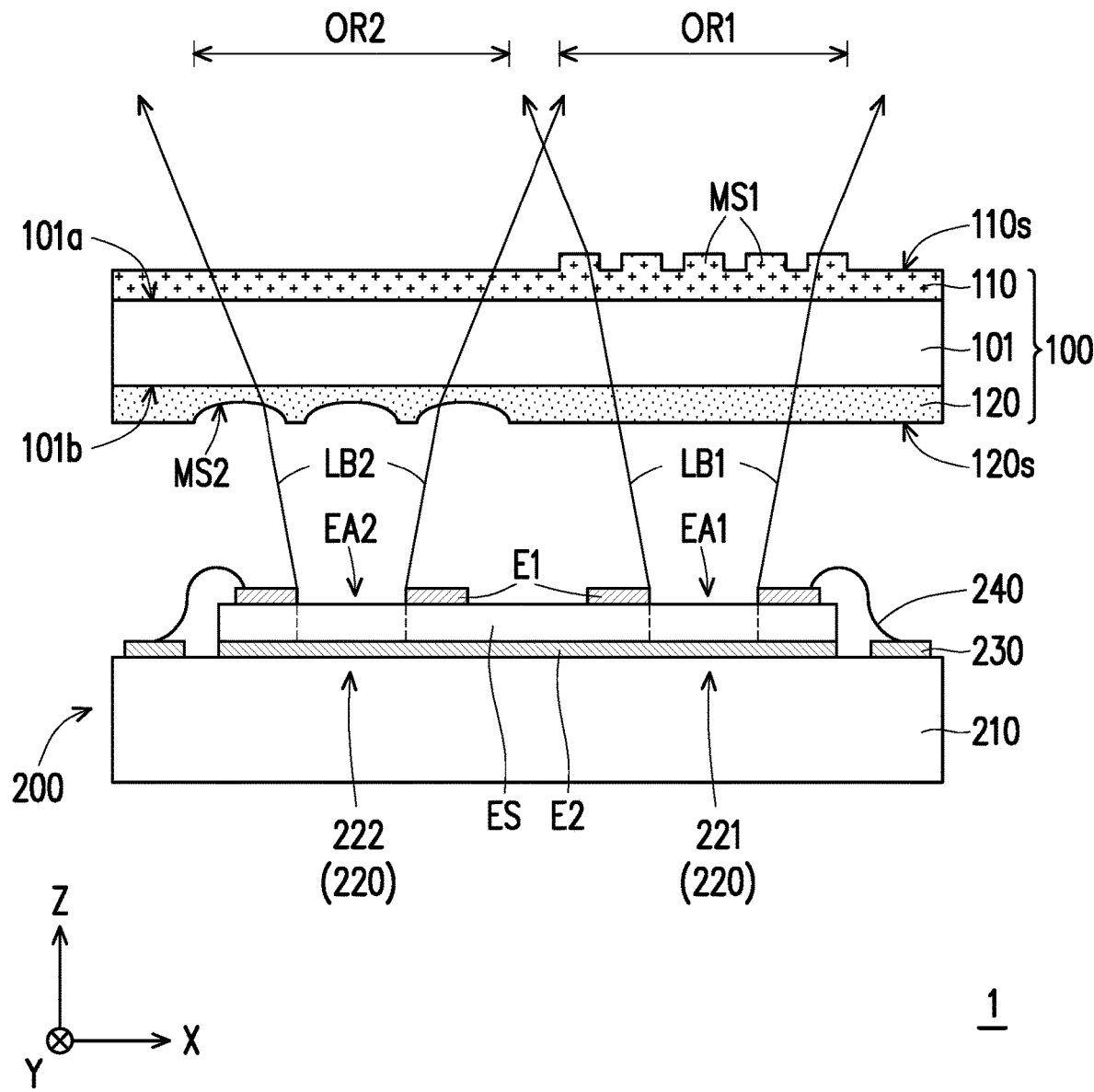
FIG. 1 is a schematic cross-sectional view of a wafer level optical module according to a first embodiment of the invention.
Figure 2:
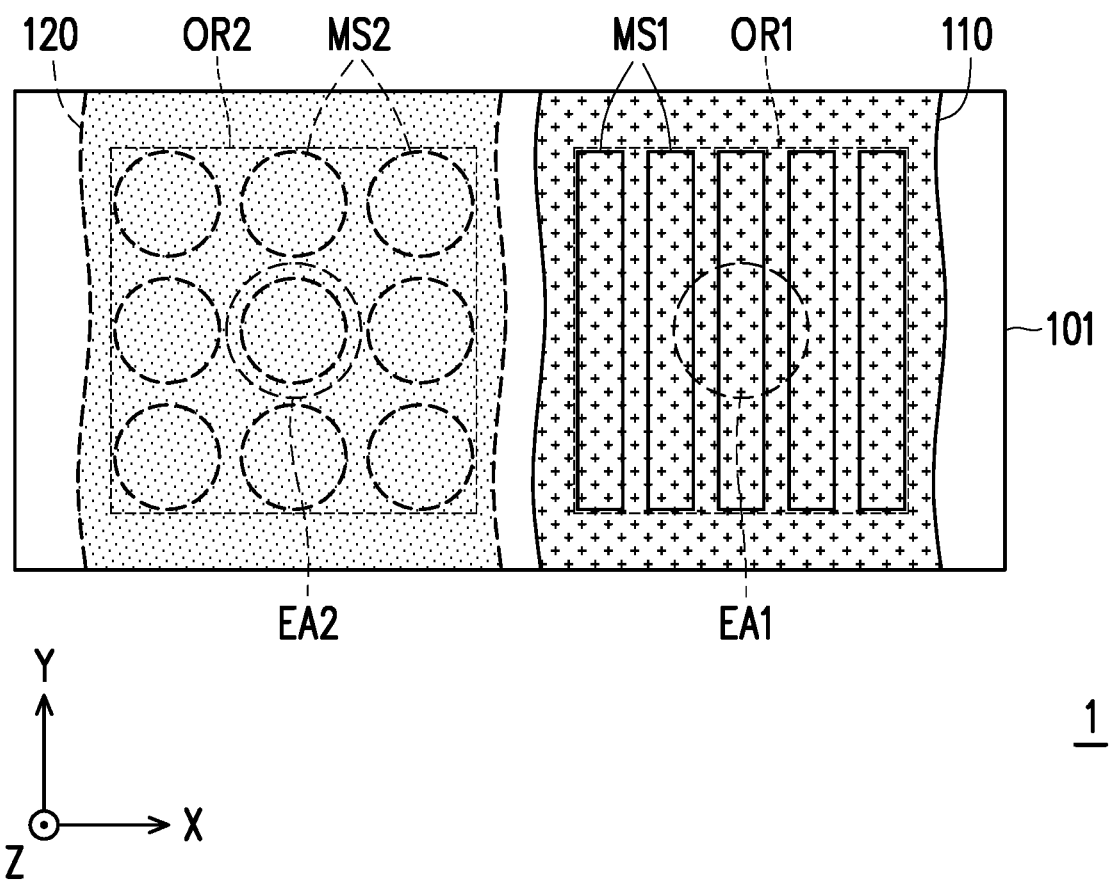
FIG. 2 is a schematic top view of the wafer level optical module in FIG. 1.

FIG. 1 is a schematic cross-sectional view of a wafer level optical module according to a first embodiment of the invention. FIG. 2 is a schematic top view of the wafer level optical module in FIG. 1. In particular, for clear presentation and explanation, FIG. 2 omits the illustration of first electrode E1, second electrode E2, epitaxial structure ES, circuit substrate 210, pad 230 and bonding wire 240 of FIG. 1.

Referring to FIG. 1 and FIG. 2, a wafer level optical module includes an optical element 100 and a light emitter 200. The optical element 100 is arranged on the optical path of the light emitter 200. Specifically, the light emitter 200 has a plurality of light exiting apertures, for example, a light exiting aperture EA1 and a light exiting aperture EA2. The optical element 100 is overlapped with these light exiting apertures. For example, in the present embodiment, the optical element 100 has a first optical region OR1 and a second optical region OR2. It should be noted that the first optical region OR1 and the second optical region OR2 are respectively overlapped with the light exiting aperture EA1 and the light exiting aperture EA2 of the light emitter 200.

In detail, the optical element 100 includes a substrate 101, a first optical film 110 and a second optical film 120. In the present embodiment, the first optical film 110 and the second optical film 120 are respectively disposed on two opposite sides 101a, 101b of the substrate 101. Accordingly, the whole thickness of the optical element 100 can be effectively reduced. However, the invention is not limited thereto. In other embodiments, two optical films may also be disposed on the same side of the substrate 101. The material of the substrate 101 includes glass, quartz, or polymer material (for example, polycarbonate, polyimide, or acrylic), but the invention is not limited thereto. The material of the first optical film 110 and the second optical film 120 includes a photocurable material (ultraviolet curable resin, for example), heat-curing material, or a combination thereof, but the invention is not limited thereto.

Further, the first optical film 110 has a first surface 110s facing away from the substrate 101 and a plurality of first optical microstructures MS1 disposed on the first surface 110s. The second optical film 120 has a second surface 120s facing away from the substrate 101 and a plurality of second optical microstructures MS2 disposed on the second substrate 120s. It is worth noting that the first optical region OR1 of the optical element 100 is defined by the first optical microstructures MS1, and the second optical region OR2 of the optical element 100 is defined by the second optical microstructures MS2.

For example, the first optical microstructures MS1 of the present embodiment are stripe patterns protruded from the first surface 110s (namely, the first optical microstructures MS1 are a plurality of protruding structures). Theses stripe patterns are arranged along a direction X and extend in a direction Y. The direction X intersects the direction Y. However, the invention is not limited thereto. According to other embodiment, the first optical microstructures MS1 may be concentric-circle pattern. In the present embodiment, a width of the stripe pattern or a pitch between adjacent stripe patterns in the direction X may be ranged from 0.2 micron to 200 microns, but the invention is not limited thereto.

On the other hand, the second optical microstructures MS2 are concave lens structures recessed from the second surface 120s (namely, the second optical microstructures MS2 are a plurality of concave structures). The outline of orthogonal projection of these concave lens structures on the second surface 120s is circular. The second optical microstructures MS2 are arranged in multiple rows and multiple columns along the direction X and the direction Y. Namely, the second optical microstructures MS2 are arranged in an array on the second surface 120s, but the invention is not limited thereto. According to other embodiment, the second optical microstructures MS2 may also be in a honeycomb-like arrangement. In the present embodiment, a width of the concave lens structure or a pitch between adjacent concave lens structures may be ranged from 10 microns to 100 microns, but the invention is not limited thereto.

In the present embodiment, the formation of the first optical microstructures MS1 of the first optical film 110 may be carried out through a molding process on a heat-curing glue layer, and the formation of the second optical microstructures MS2 of the second optical film 120 may be carried out through an imprinting process on a photocurable glue layer. The coating process of the heat-curing glue layer and photocurable glue layer may include spraying process, spin-coating process, or dispensing process. However, the invention is not limited thereto. In other embodiments, the material of the first optical film 110 and the material of the second optical film 120 may be adjusted to be the same according to the actual optical design requirement of the optical element. It should be understood that the formation method of the first optical film 110 and the second optical film 120 can be adjusted as well according to the material selection of the optical film and the actual design condition of optical microstructures.

It should be noted that the number of the first optical microstructures MS1 and the number of the second optical microstructures MS2 illustrated in FIG. 2 are exemplarily described by taking five and nine as example, and does not mean that the invention is limited thereto. In other embodiments, the number of the first optical microstructures MS1 and the number of the second optical microstructures MS2 may also be adjusted according to the actual design requirement of the optical element.

The light emitter 200 includes a controlling circuit board 210 and at least two light emitting devices 220 (for example, a light emitting device 221 and a light emitting device 222). The at least two light emitting devices 220 are disposed on the controlling circuit board 210 and electrically coupled to the controlling circuit board 210. More specifically, the controlling circuit board 210 has a plurality of pads 230, and the at least two light emitting devices 220 are electrically connected to the pads 230 through a plurality of bonding wires 240. It should be noted that the at least two light emitting devices 220 are independently controllable by the controlling circuit board 210.

Each of the light emitting devices 220 has a first electrode E1, a second electrode E2 and an epitaxial structure ES. The first electrode E1 and the second electrode E2 are disposed on two opposite sides of the epitaxial structure ES. In the present embodiment, the first electrode E1 may be a ring-like structure, and the light exiting aperture can be defined by the first electrode E1. For example, the light exiting aperture EA1 and the light exiting aperture EA2 are respectively defined by the first electrodes E1 of the light emitting device 221 and the light emitting device 222. The light emitting device 221 and the light emitting device 222 can be independently controlled by the controlling circuit board 210 to emit a light beam LB1 and a light beam LB2, respectively.

The light beam LB1 emitted from the light exiting aperture EA1 is transmitted to the first optical microstructures MS1. The light beam LB2 emitted from the light exiting aperture EA2 is transmitted to the second optical microstructures MS2. From another point of view, the first optical region OR1 (or the first optical microstructures MS1) of the optical element 100 cannot be irradiated by the light beam LB1 emitting from the light exiting aperture EA1, and the second optical region OR2 (or the second optical microstructures MS2) of the optical element 100 cannot be irradiated by the light beam LB2 emitting from the light exiting aperture EA2.

It is worth noting that the orthogonal projection of the first optical microstructures MS1 on the substrate 101 does not overlap with the orthogonal projection of the second optical microstructures MS2 on the substrate 101 along the normal direction (for example, a direction Z) of the first surface 110s, so that the optical element 100 can be provided with more optical functionality. Accordingly, the integration degree of the wafer level optical module 1 can also be improved. For example, the first optical microstructures MS1 of the first optical film 110 may act as a diffractive optical element (DOE), and a combination of the light emitting device 221 and the first optical microstructures MS1 may be a flood illuminator. On the other hand, the second optical microstructures MS2 of the second optical film 120 may act as a fly-eye lens, and a combination of the light emitting device 222 and the second optical microstructures MS2 may be a dot projector. That means, the wafer level optical module of the present embodiment could be a 3D sensor module, but the invention is not limited thereto.

In the present embodiment, the light emitting device 220 may be a vertical cavity surface emitting laser (VCSEL). Namely, the at least two light emitting devices 220 may form a VCSEL array. However, the invention is not limited thereto. According to other embodiments, the light emitting device 220 may also be a micro light emitting diode (micro-LED) or a mini light emitting diode (mini-LED). In the present embodiment, the epitaxial structures ES of the light emitting devices 200 are connected to each other. That means, the epitaxial structures ES of the light emitting device 221 and the light emitting device 222 can be formed on the same epitaxial substrate (for example, a GaAs substrate or a Sapphire substrate), but the invention is not limited thereto.

In the following, other embodiments are provided to explain the disclosure in detail, wherein same components will be denoted by the same reference numerals, and the description of the same technical content will be omitted. For the omitted part, please refer to the foregoing embodiment, and the details are not described below. The descriptions regarding the omitted part may be referred to the previous embodiment, and thus will not be repeated herein.

Figure 3:
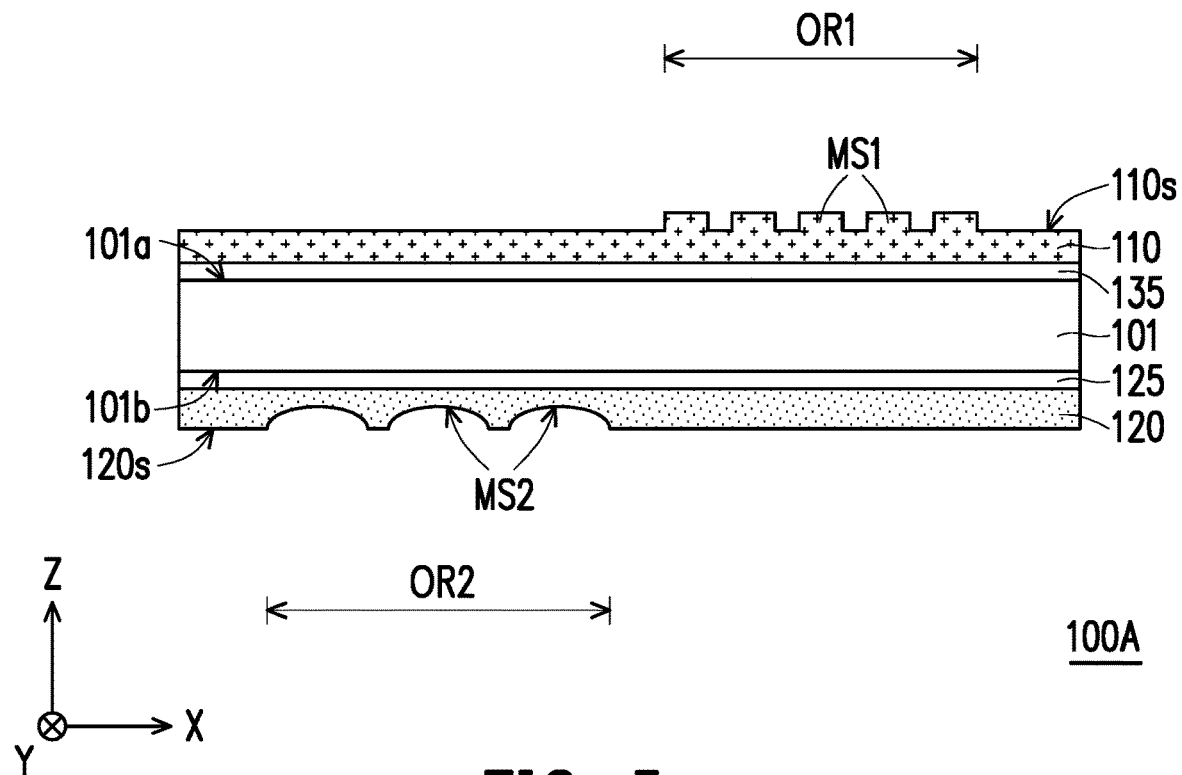
FIG. 3 is a schematic cross-sectional view of an optical element according to a second embodiment of the invention.

FIG. 3 is a schematic cross-sectional view of an optical element according to a second embodiment of the invention.

Referring to FIG. 3, the difference between the optical element 100A of the present embodiment and the optical element 100 of FIG. 1 lies in the composition of the optical element. In the present embodiment, the optical element 100A further includes an index matching layer 135 and a buffer layer 125. The index matching layer 135 is disposed between the substrate 101 and the first optical film 110. The buffer layer 125 is disposed between the substrate 101 and the second optical film 120. Due to the refractive index of the first optical film 110 is high (for example, the refractive index is greater than 1.7), the reflection of the light beam at the interface between the substrate 101 and the first optical film 110 can be inhibited by configuring the index matching layer 135. In the present embodiment, the width of the first optical microstructure MS1 or the pitch between adjacent first optical microstructures MS1 in the direction X may be less than 1.5 microns.

On the other hand, by configuring the buffer layer 125, the reliability of the optical element 100A under thermal cycle test can be improved. That is, the resistance of the optical element 100A to repeated heat/cold shocks can be increased. However, the invention is not limited thereto. In other embodiments, the optical element may merely have the index matching layer 135 or the buffer layer 125.

Figure 4:
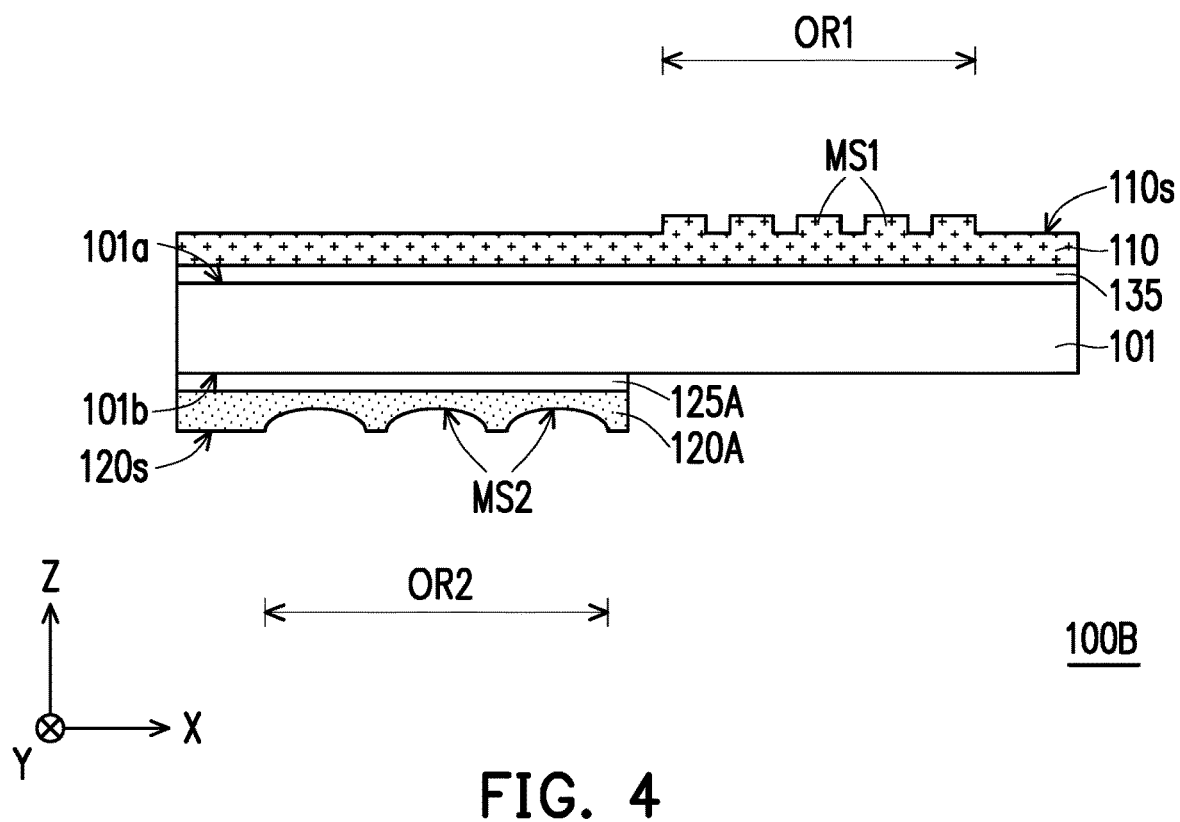
FIG. 4 is a schematic cross-sectional view of an optical element according to a third embodiment of the invention.
Figure 5:
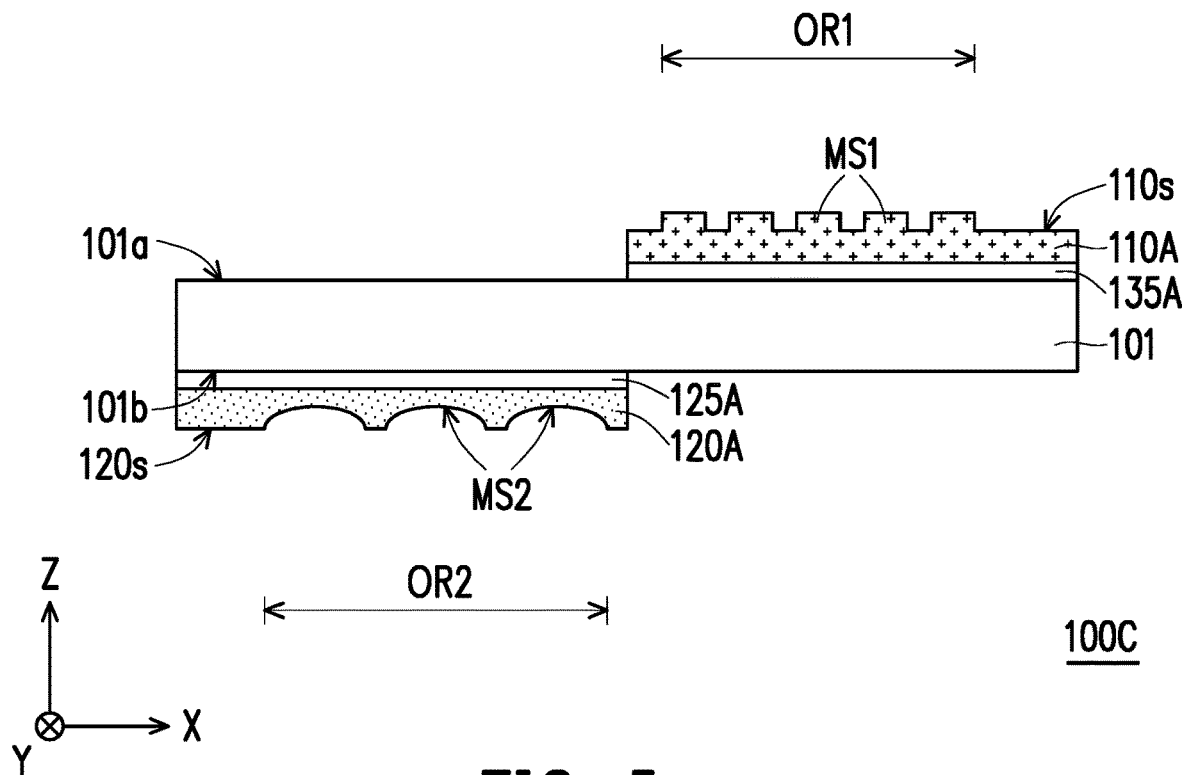
FIG. 5 is a schematic cross-sectional view of an optical element according to a fourth embodiment of the invention.

FIG. 4 is a schematic cross-sectional view of an optical element according to a third embodiment of the invention. FIG. 5 is a schematic cross-sectional view of an optical element according to a fourth embodiment of the invention.

Referring to FIG. 4, the difference between the optical element 100B of the present embodiment and the optical element 100A of FIG. 3 lies in the configuration of the optical element. In the present embodiment, the orthogonal projections of the second optical film 120A and the buffer layer 125A on the substrate 101 do not overlap the orthogonal projection of the first optical microstructures MS1 of the first optical film 110 on the substrate 101.

For example, compared to the optical element 100A of FIG. 3, the manufacturing process of the optical element 100B may further include a laser cutting process. The laser cutting process is carried out to remove a part of the second optical film 120 (as shown in FIG. 3) overlapping the first optical region OR1 (or the first optical microstructures MS1) and then obtain the second optical film 120A, but the invention is not limited thereto. It should be noted that a part of the buffer layer 125 (as shown in FIG. 3) overlapping the first optical region OR1 (or the first optical microstructures MS1) is also simultaneously removed in the laser cutting process to obtain the buffer layer 125A of FIG. 4. Namely, the remaining part of the buffer layer 125A does not overlap the first optical microstructures MS1 of the first optical film 110 along a normal direction (for example, the direction Z) of the first surface 101a.

However, the invention is not limited thereto, the manufacturing process of the optical element may include two laser cutting process. Referring to FIG. 5, compared to the optical element 100B of FIG. 4, additional laser cutting process may be carried out to remove a part of the first optical film 110 (as shown in FIG. 4) overlapping the second optical region OR2 (or the second optical microstructures MS2) and then obtain the first optical film 110A. Similarly, a part of the index matching layer 135 (as shown in FIG. 4) overlapping the second optical region OR2 (or the second optical microstructures MS2) may also be simultaneously removed in the additional laser cutting process to obtain the index matching layer 135A of FIG. 5. Namely, the remaining part of the index matching layer 135A does not overlap the second optical film 120A and the buffer layer 125A along the normal direction (for example, the direction Z) of the first surface 101a.

Figure 6:
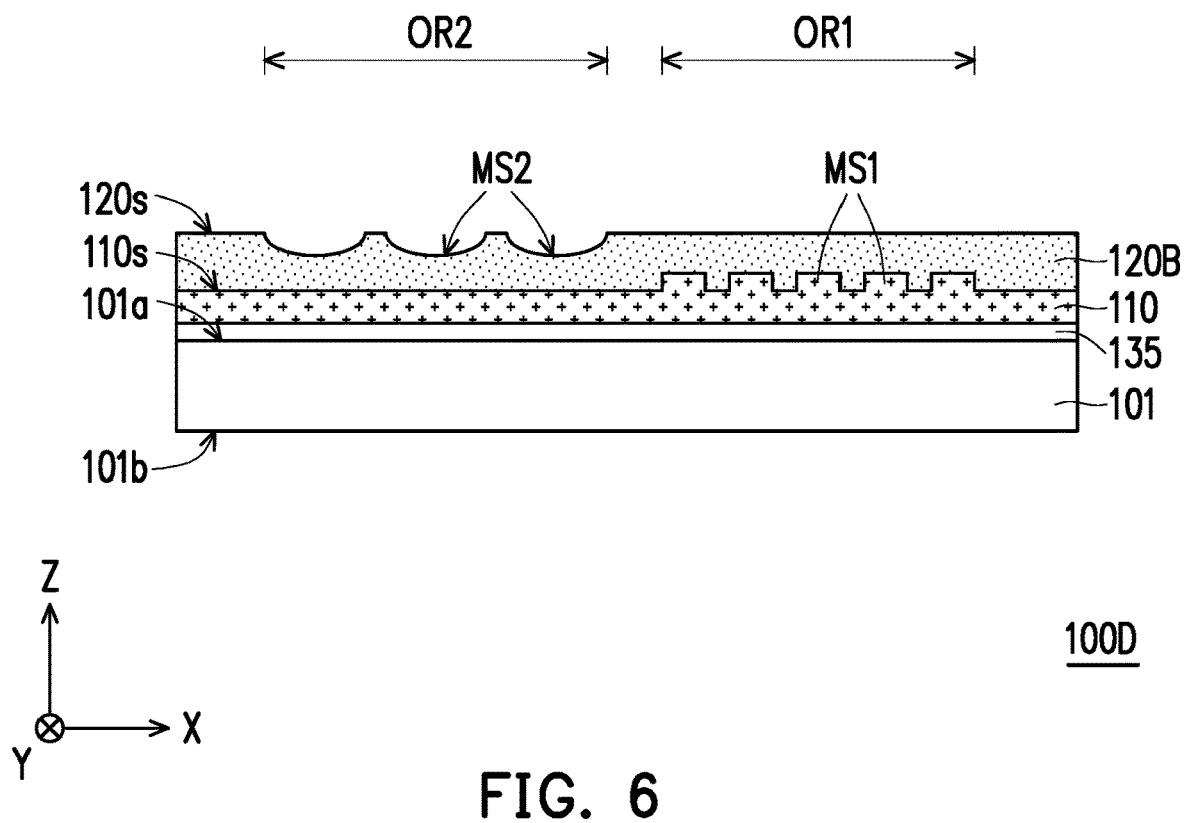
FIG. 6 is a schematic cross-sectional view of an optical element according to a fifth embodiment of the invention.

FIG. 6 is a schematic cross-sectional view of an optical element according to a fifth embodiment of the invention.

Referring to FIG. 6, the difference between the optical element 100D of the present embodiment and the optical element 100 of FIG. 1 lies in the configuration of the optical element. In the present embodiment, the first optical film 110 and the second optical film 120B are located on the same side (for example, the side 101a) of the substrate 101. The first optical film 110 is positioned between the substrate 101 and the second optical film 120B. In addition, due to the refractive index of the first optical film 110 is high (for example, the refractive index is greater than 1.7), the reflection of the light beam at the interface between the substrate 101 and the first optical film 110 can be inhibited by configuring an index matching layer 135. The index matching layer 135 is positioned between the substrate 101 and the first optical film 110.

Figure 7:
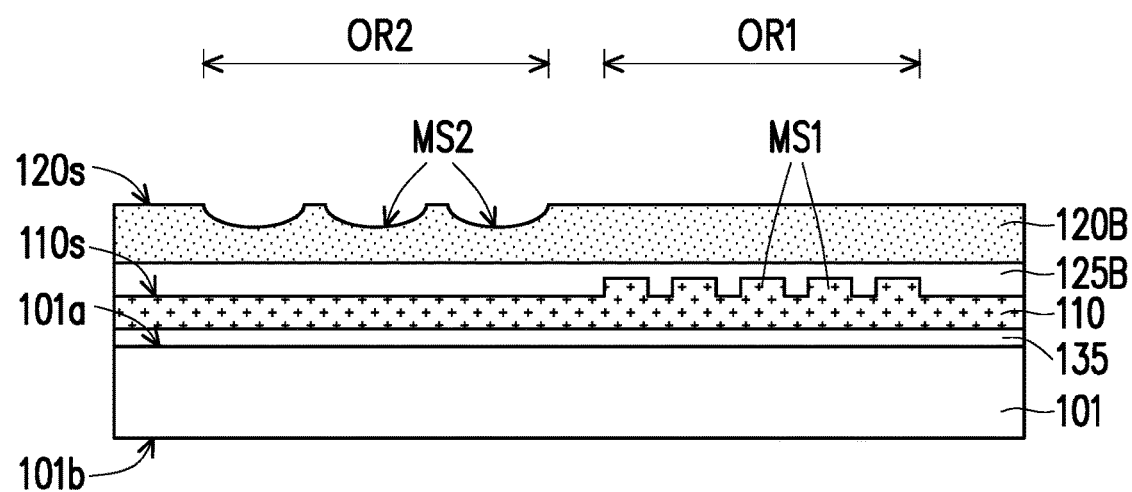
FIG. 7 is a schematic cross-sectional view of an optical element according to a sixth embodiment of the invention.
Figure 7:
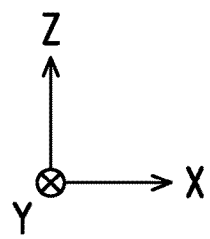

FIG. 7 is a schematic cross-sectional view of an optical element according to a sixth embodiment of the invention.

Referring to FIG. 7, the difference between the optical element 100E of the present embodiment and the optical element 100D lies in the configuration of the optical element. Specifically, the optical element 100E further includes a buffer layer 125B. The buffer layer 125B is located between the first optical film 110 and the second optical film 120B. It is worth noting that the reliability of the optical element 100A under thermal cycle test can be improved by configuring the buffer layer 125B. That is, the resistance of the optical element 100E to repeated heat/cold shocks can be increased.

Figure 8:
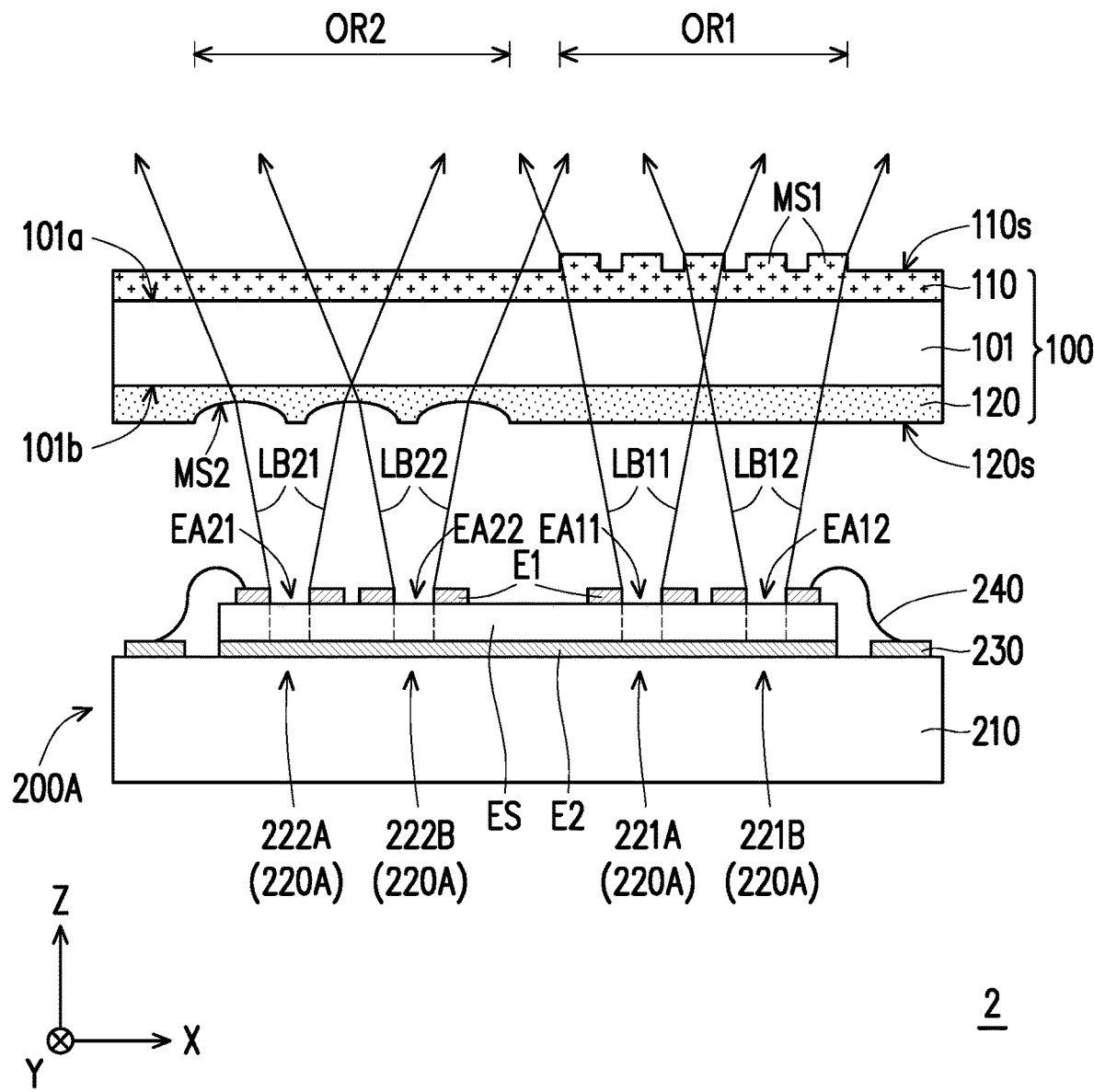
FIG. 8 is a schematic cross-sectional view of a wafer level optical module according to another embodiment of the invention.
Figure 9:
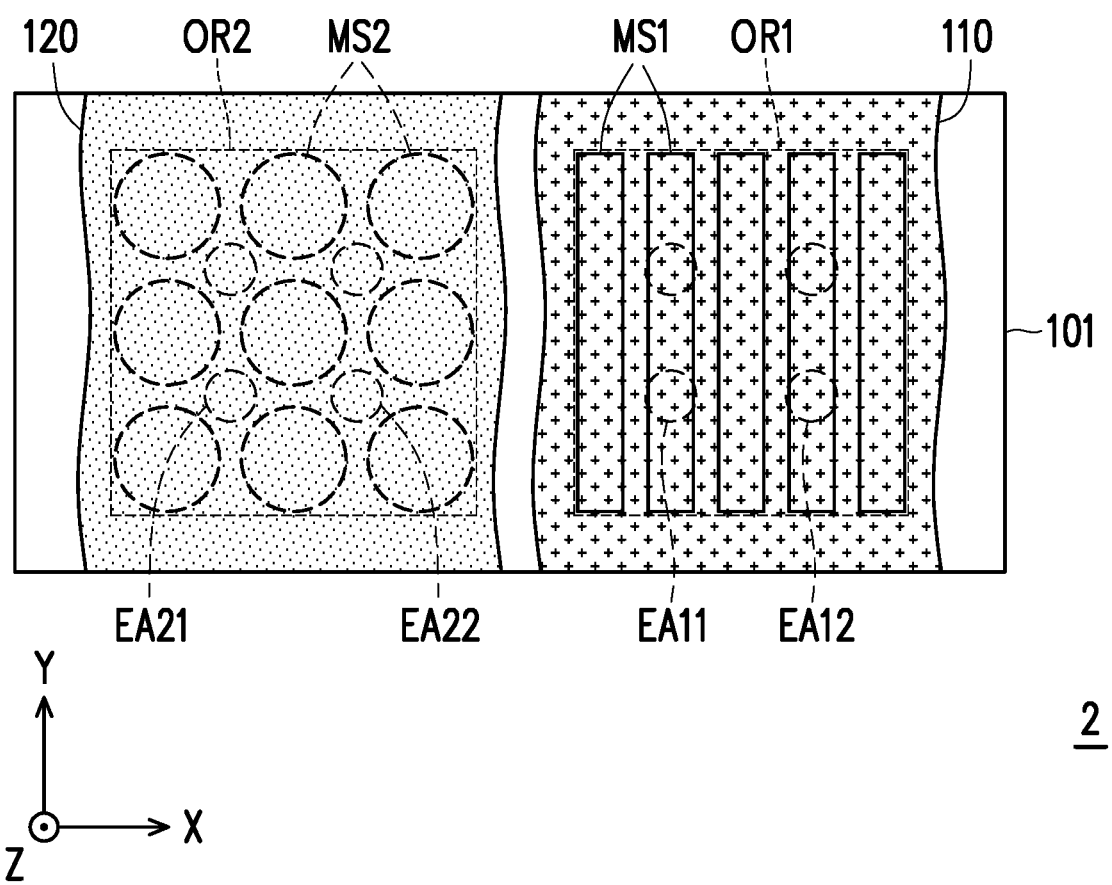
FIG. 9 is a schematic top view of the wafer level optical module in FIG. 8.

FIG. 8 is a schematic cross-sectional view of a wafer level optical module according to another embodiment of the invention. FIG. 9 is a schematic top view of the wafer level optical module in FIG. 8. In particular, for clear presentation and explanation, FIG. 9 omits the illustration of first electrode E1, second electrode E2, epitaxial structure ES, circuit substrate 210, pad 230 and bonding wire 240 of FIG. 8.

Referring to FIG. 8 and FIG. 9, the difference between the wafer level optical module 2 of the present embodiment and the wafer level optical module 1 lies in the configuration of the light emitter. For example, the number of the light emitting device 220A overlapping each optical region is greater than that of the light emitting device 220 of FIG. 1. In the present embodiment, the light emitter 200A includes eight light emitting devices 220A. Part of the light emitting devices 220A (for example, the light emitting device 221A and the light emitting device 221B) overlap the first optical region OR1 and the rest part of the light emitting devices 220A (for example, the light emitting device 222A and the light emitting device 222B) overlap the second optical region OR2. From another point of view, each of the optical region OR1 and the optical region OR2 are overlapped with four light exiting aperture of the light emitter 200A.

It should be noted that the light emitter 200A is similar to the light emitter 200 of FIG. 1. Therefore, for detail description, please refer to the relevant paragraphs of the foregoing embodiment, and will not be repeated here. In the present embodiment, for example, the light exiting aperture EA11, the light exiting aperture EA12, the light exiting aperture EA21 and the light exiting aperture EA22 are respectively defined by the first electrodes E1 of the light emitting device 221A, the light emitting device 221B, the light emitting device 222A and the light emitting device 222B. The light emitting devices 220A can be independently controlled by the controlling circuit board 210 to emit light beams, respectively.

For example, the light beam LB11 emitted from the light exiting aperture EA11 and the light beam LB12 emitted from the light exiting aperture EA12 are transmitted to different parts of the first optical microstructures MS1. Similarly, the light beam LB21 emitted from the light exiting aperture EA21 and the light beam LB22 emitted from the light exiting aperture EA22 are transmitted to different parts of the second optical microstructures MS2. More specifically, each of the first optical region OR1 and the second optical region OR2 of the optical element 100 can be locally irradiated by at least one selected light emitting device 220A. The wafer level optical module 2 may enable at least one light emitting device 220A for power saving according to the position of an object or a projection surface. From another point of view, the operational flexibility of the wafer level optical module 2 can also be improved.

In summary, in the optical element and the wafer level optical module according to an embodiment of the disclosure, two optical films are disposed on at least one side of the substrate and are both formed on the substrate so that the whole thickness of the optical element can be effectively reduced. Further, each of the optical films has a plurality of optical microstructures. The optical microstructures of one of the optical films does not overlap the optical microstructures of the other of the optical films so that the optical element can be provided with more optical functionality. Accordingly, the integration degree of the wafer level optical module can be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical element, comprising:
   a substrate;
   a first optical film and a second optical film, disposed on at least one side of the substrate and both formed on the substrate, the first optical film has a first surface facing away from the substrate and a plurality of first optical microstructures disposed on the first surface, the second optical film has a second surface facing away from the substrate and a plurality of second optical microstructures disposed on the second surface, wherein the orthogonal projection of the first optical microstructures on the substrate does not overlap the orthogonal projection of the second optical microstructures on the substrate; and
   a buffer layer, disposed between the substrate and the second optical film, and directly connects the second optical film, wherein the orthogonal projection of the buffer layer on the substrate does not overlap the orthogonal projection of the first optical microstructures.

2. The optical element as claimed in claim 1, wherein the substrate has a first side and a second side opposite to each other, and the first optical film and the second optical film are respectively disposed on the first side and the second side of the substrate.

3. The optical element as claimed in claim 2, wherein the orthogonal projection of the first optical film on the substrate does not overlap the orthogonal projection of the second optical film.

4. The optical element as claimed in claim 1, further comprising:
   an index matching layer, disposed between the substrate and the first optical film.

5. The optical element as claimed in claim 4, wherein the orthogonal projection of the index matching layer on the substrate does not overlap the orthogonal projection of the second optical microstructures on the substrate.

6. A optical element, comprising:
   a substrate;
   a first optical film and a second optical film, disposed on at least one side of the substrate and both formed on the substrate, the first optical film has a first surface facing away from the substrate and a plurality of first optical microstructures disposed on the first surface, the second optical film has a second surface facing away from the substrate and a plurality of second optical microstructures disposed on the second surface, wherein the orthogonal projection of the first optical microstructures on the substrate does not overlap the orthogonal projection of the second optical microstructures on the substrate; and
   a buffer layer, disposed between the substrate and the second optical film, and directly connects the second optical film, wherein the first optical film and the second optical film are located on the same side of the substrate, the first optical film is positioned between the substrate and the second optical film, the first optical microstructures are a plurality of protruding structures, and the second optical microstructures are a plurality of concave structures.

7. The optical element as claimed in claim 6, further comprising:
   an index matching layer, disposed between the substrate and the first optical film.

8. A wafer level optical module, comprising:
   an optical element, comprising:

a substrate; and a first optical film and a second optical film, disposed on at least one side of the substrate and both formed on the substrate, the first optical film has a first surface facing away from the substrate and a plurality of first optical microstructures disposed on the first surface, the second optical film has a second surface facing away from the substrate and a plurality of second optical microstructures disposed on the second surface, wherein the orthogonal projection of the first optical microstructures on the substrate does not overlap the orthogonal projection of the second optical microstructures on the substrate;

a light emitter, having at least two light emitting devices, wherein the optical element is arranged on an optical path of the light emitter, one of the at least two light emitting devices overlaps the first optical microstructures, and another one of the at least two light emitting devices overlaps the second optical microstructures; and a buffer layer, disposed between the substrate and the second optical film, and directly connects the second optical film, wherein the orthogonal projection of the buffer layer on the substrate does not overlap the orthogonal projection of the first optical microstructures on the substrate.

9. The wafer level optical module as claimed in claim 8, wherein the at least two light emitting devices are a vertical cavity surface emitting laser array.

10. The wafer level optical module as claimed in claim 8, further comprising:

a controlling circuit board, electrically coupled to the at least two light emitting devices, wherein the at least two light emitting devices are independently controllable by the controlling circuit board.

11. The wafer level optical module as claimed in claim 8, wherein the substrate has a first side and a second side opposite to each other, and the first optical film and the second optical film are respectively disposed on the first side and the second side of the substrate.

12. The wafer level optical module as claimed in claim 11, wherein the orthogonal projection of the first optical film on the substrate does not overlap the orthogonal projection of the second optical film on the substrate.

13. The wafer level optical module as claimed in claim 11, further comprising:

an index matching layer, disposed between the substrate and the first optical film.

14. The wafer level optical module as claimed in claim 13, wherein the orthogonal projection of the index matching layer on the substrate does not overlap the orthogonal projection of the second optical microstructures on the substrate.

15. A wafer level optical module, comprising:

an optical element, comprising:

a substrate; and a first optical film and a second optical film, disposed on at least one side of the substrate and both formed on the substrate, the first optical film has a first surface facing away from the substrate and a plurality of first optical microstructures disposed on the first surface, the second optical film has a second surface facing away from the substrate and a plurality of second optical microstructures disposed on the second surface, wherein the orthogonal projection of the first optical microstructures on the substrate does not overlap the orthogonal projection of the second optical microstructures on the substrate;

a light emitter, having at least two light emitting devices, wherein the optical element is arranged on an optical path of the light emitter, one of the at least two light emitting devices overlaps the first optical microstructures, and another one of the at least two light emitting devices overlaps the second optical microstructures; and a buffer layer, disposed between the substrate and the second optical film, and directly connects the second optical film, wherein the first optical film and the second optical film are located on the same side of the substrate, the first optical film is positioned between the substrate and the second optical film, the first optical microstructures are a plurality of protruding structures, and the second optical microstructures are a plurality of concave structures.

16. The wafer level optical module as claimed in claim 15, further comprising:

an index matching layer, disposed between the substrate and the first optical film.

* * * * *